United States Patent
Duncan et al.

(10) Patent No.: US 8,392,667 B2
(45) Date of Patent: Mar. 5, 2013

(54) DEADLOCK AVOIDANCE BY MARKING CPU TRAFFIC AS SPECIAL

(75) Inventors: Samuel H. Duncan, Arlington, MA (US); David B. Glasco, Austin, TX (US); Wei-Je Huang, Fremont, CA (US); Atul Kalambur, Bangalore (IN); Patrick R. Marchand, Apex, NC (US); Dennis K. Ma, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 595 days.

(21) Appl. No.: 12/334,394

(22) Filed: Dec. 12, 2008

(65) Prior Publication Data

US 2010/0153658 A1 Jun. 17, 2010

(51) Int. Cl.
*G06F 12/00* (2006.01)
(52) U.S. Cl. .................. 711/151; 711/E12.001
(58) Field of Classification Search .................. 711/151
See application file for complete search history.

(56) References Cited

U.S. PATENT DOCUMENTS

| | | | | |
|---|---|---|---|---|
| 5,696,927 A * | 12/1997 | MacDonald et al. | ......... | 711/207 |
| 6,026,451 A * | 2/2000 | Sreenivas | ........................ | 710/39 |
| 6,950,438 B1 | 9/2005 | Owen et al. | | |
| 2002/0174299 A1* | 11/2002 | Hayter et al. | ................. | 711/118 |
| 2005/0237329 A1 | 10/2005 | Rubinstein et al. | | |
| 2005/0251612 A1 | 11/2005 | Creta et al. | | |
| 2006/0064695 A1* | 3/2006 | Burns et al. | ................... | 718/100 |
| 2008/0028181 A1* | 1/2008 | Tong et al. | ..................... | 711/207 |

FOREIGN PATENT DOCUMENTS

| | | |
|---|---|---|
| JP | 10-247138 | 9/1998 |
| JP | 2000347935 | 12/2000 |
| JP | 2007535006 | 11/2007 |
| JP | 2008033928 | 2/2008 |
| WO | 02/15470 | 2/2002 |

OTHER PUBLICATIONS

Search and Examination Report, GB Pat. App. No. 0920727.5, dated Mar. 15, 2010.
JP Office Action, Application No. 2009-275656 dated Feb. 8, 2012.

* cited by examiner

*Primary Examiner* — Hashem Farrokh
*Assistant Examiner* — Larry Mackall
(74) *Attorney, Agent, or Firm* — Patterson & Sheridan, LLP

(57) ABSTRACT

Deadlocks are avoided by marking read requests issued by a parallel processor to system memory as "special." Read completions associated with read requests marked as special are routed on virtual channel 1 of the PCIe bus. Data returning on virtual channel 1 cannot become stalled by write requests in virtual channel 0, thus avoiding a potential deadlock.

17 Claims, 6 Drawing Sheets

DEADLOCK AVOIDANCE BY MARKING CPU TRAFFIC AS SPECIAL

BACKGROUND OF THE INVENTION

1. Field of the Invention

The present invention generally relates to computer hardware and, more specifically, to methods and systems that avoid deadlocks by marking CPU traffic as special.

2. Description of the Related Art

A conventional computer system includes a central processing unit (CPU) and may also include a co-processor known as a parallel processing unit (PPU). The CPU offloads certain processing operations to the PPU to reduce the processing workload of the CPU. These processing operations include, among others, compression and decompression operations. The CPU issues requests to the PPU, including read requests and/or write requests, when the CPU requires these processing operations. For example, the CPU may need to write data to system memory that might be stored in a compressed format. The CPU transmits a write request to the PPU, and the PPU may then read and decompress data associated with the write request and write the original data, decompressed and merged with the new data, to the system memory.

At times, a write request issued by the CPU may cause the PPU to issue one or more "derivative" read requests that must be completed before the initial write request can complete. For example, the PPU may issue a derivative read request that targets a system memory unit associated with the CPU. When the read transaction is completed, the system memory issues a read completion to the PPU that notifies the PPU that the transaction is complete.

Problems may arise, however, when the CPU and the PPU are connected by a peripheral component interface express (PCIe) bus that has one or more pending write requests. Due to the ordering rules of the PCIe bus, read completions cannot pass write requests, and so any derivative read requests cannot return read completions to the PPU. Thus, the initial write request cannot complete. This situation is known in the art as a circular dependency, or "deadlock." A deadlock halts some or all communication between the CPU and the PPU and negatively affects the processing throughput of the computer system. Some examples of deadlock conditions are discussed below.

In a first example, a deadlock may occur if the PPU needs to read from a page table stored in system memory and write requests are pending in the PCIe bus. When the PPU issues a read request to system memory to retrieve an entry from the page table, a read completion associated with the read request cannot return to the PPU, and so the initial write request cannot complete.

A deadlock may also occur when the CPU issues a write request to the PPU that targets a cache line in a cache memory unit associated with the PPU. In order to complete the write request, the PPU first determines whether the cache line is compressed by examining a tag store. The tag store indicates a compression status associated with recently accessed cache lines in the cache memory unit. When the tag store does not include the compressions status of the cache line specified by the write request, the PPU issues a read request to system memory to access a backing store that includes the compression status of each cache line in the cache memory unit. The backing store returns the compression status of the specified cache line and issues a read completion. However, a deadlock may occur when write requests are pending in the PCIe because the read completion associated with the read request cannot pass these pending write requests.

A third deadlock may occur when the CPU attempts to write data to a region of system memory that is compressed, known in the art as a "compression tile." The CPU issues a write request to the PPU that specifies the compression tile and includes the write data. The PPU issues a read request to system memory to read the compression tile. A deadlock may occur when write requests are pending in the PCIe because, again, a read completion associated with the read request cannot pass these pending write requests.

In addition to these three examples, numerous other circumstances may cause a deadlock. Accordingly, there remains a need in the art for methods and systems that avoid deadlocks.

SUMMARY OF THE INVENTION

Embodiments of the invention provide a method and system that avoid deadlocks in a computer system having a first processing unit, a second processing unit, a memory bridge, a system memory, and a bus that connects the second processing unit to the first processing unit, the memory bridge, and the system memory. Deadlock is avoided when a read or write request is transmitted from the first processing unit to the second processing unit.

A method for avoiding deadlocks, according to an embodiment of the invention, includes receiving a read or write request at the second processing unit over a first virtual channel of the bus, generating a derivative read request at the second processing unit while processing the read or write request, transmitting the derivative read request to the system memory over a second virtual channel of the bus, receiving a completion of the derivative read request over the second virtual channel of the bus, and completing the received read or write request.

A system for avoiding deadlocks, according to an embodiment of the invention, includes a bus interface unit within the second processing unit. The bus interface unit is configured to receive a read or write request from the first processing unit over the first virtual channel and transmit a derivative read request that is generated while processing the read or write request over the second virtual channel.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
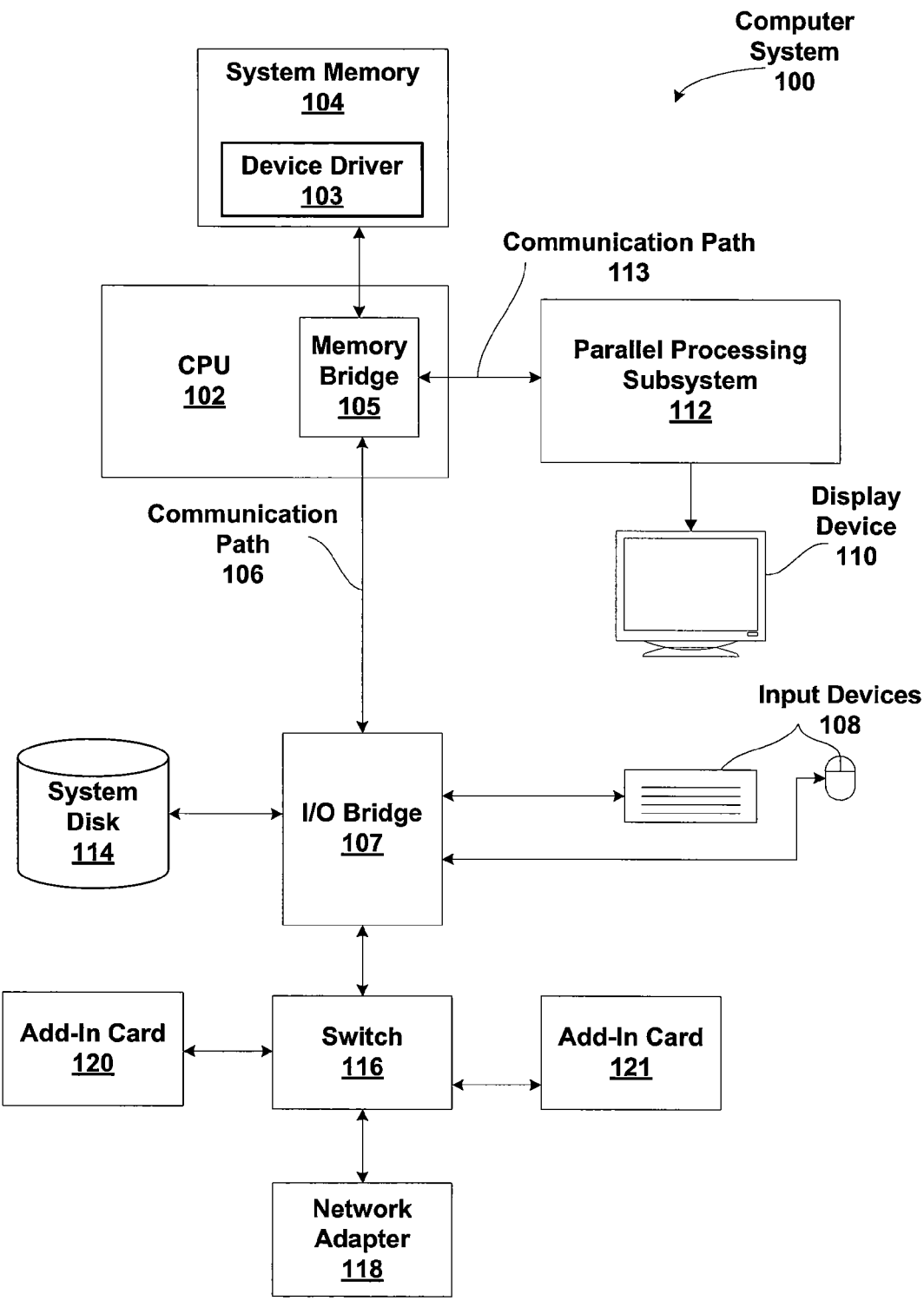
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
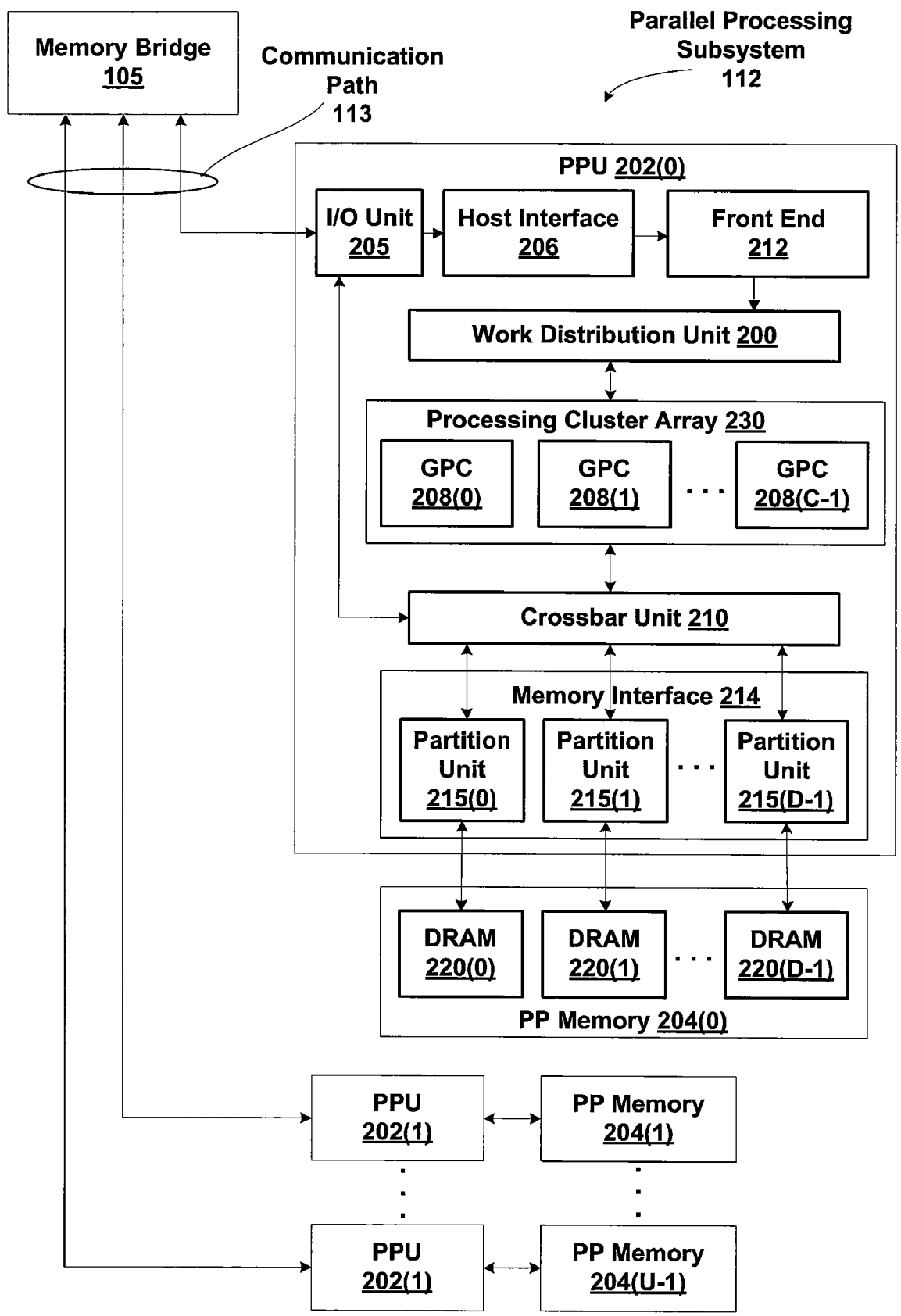
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

Referring to FIG. 2, in some embodiments, there may be no local PP Memory 204, and memory references are reflected by a local cache (not shown) through crossbar unit 210 and I/O unit 205 back to system memory 104 (not shown here).

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≧1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. In one embodiment, DRAM 220 may be omitted altogether, and memory requests are reflected back through crossbar 210 and I/O Unit 205 to memory bridge 105. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
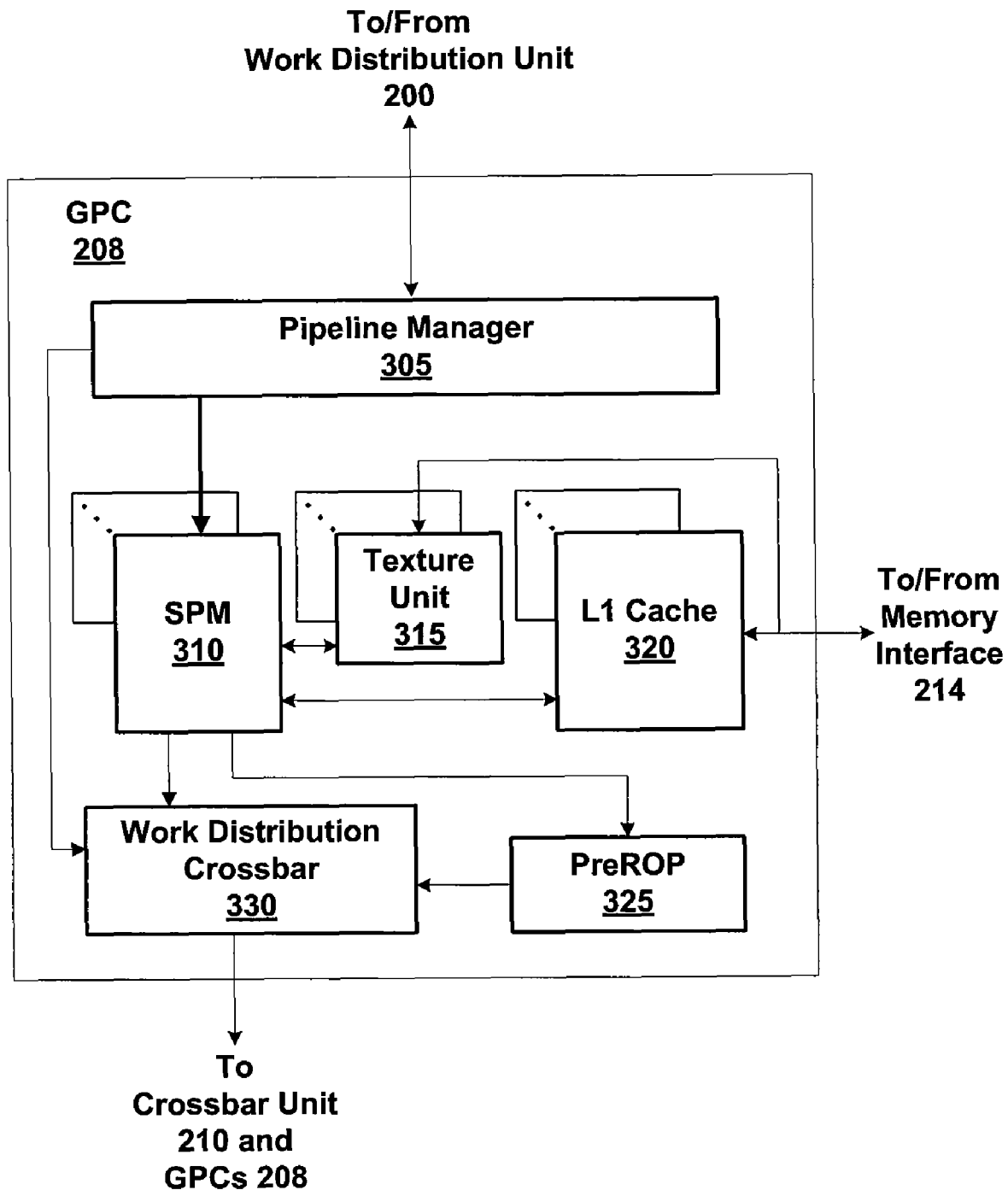
FIG. 3A is a block diagram of a general processing cluster (GPC) within one of the parallel processing units (PPUs) of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
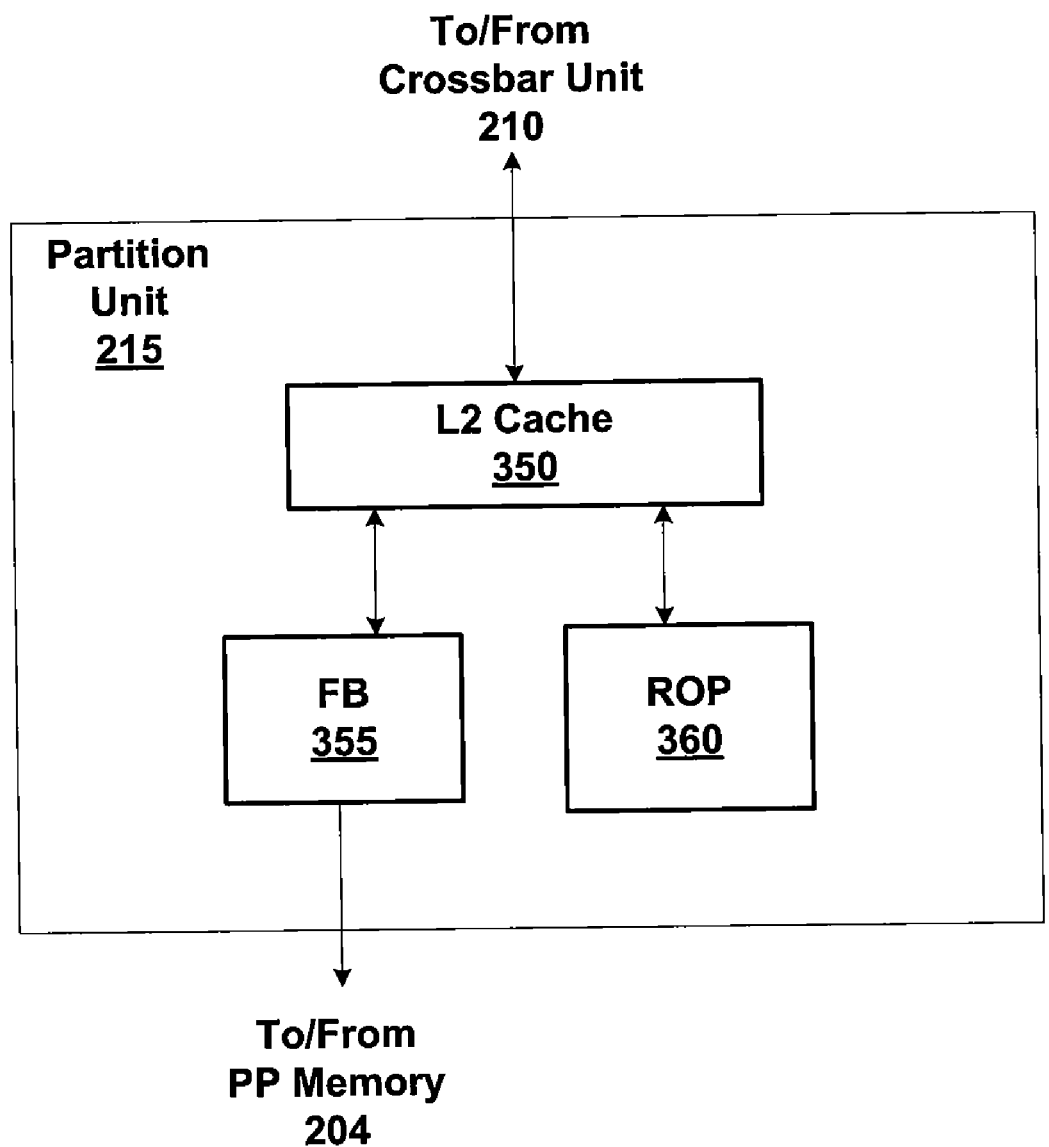
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Deadlock Avoidance

When communication path 113 is a PCIe bus, pending write requests in the PCIe bus prevent read completions returned from system memory 104 from reaching PP subsystem 202. When a read completion is required by PP subsystem 202 before a pending write requests can be handled, deadlock occurs. Embodiments of the present invention provide a technique to route read completions through a virtual channel (VC) of the PCIe that is separate from the VC used to transmit write requests. Accordingly, read completions are not impeded from reaching PP subsystem 202 and deadlocks are avoided.

Figure 4:
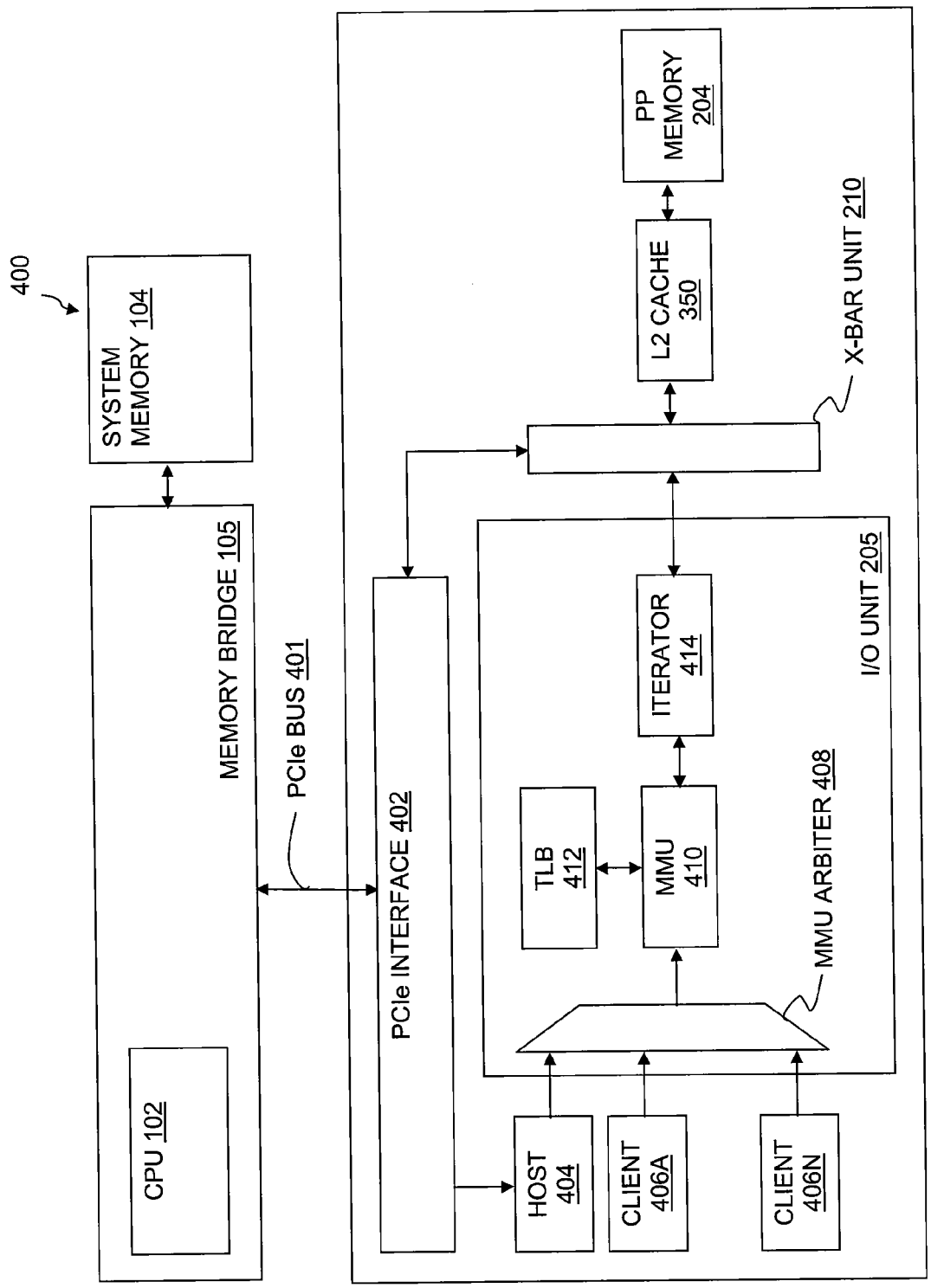
FIG. 4 is a block diagram of a computer system configured to avoid deadlocks, according to one embodiment of the present invention.

FIG. 4 is a block diagram of a computer system 400 configured to avoid deadlocks, according to one embodiment of the present invention. As shown, computer system 400 includes CPU 102 integrated with memory bridge 105, system memory 104, peripheral component interface express (PCIe) bus 401, and PP subsystem 202. CPU 102 is coupled to system memory 104 via memory bridge 105. CPU 102 is also coupled to PP subsystem 202 via memory bridge 105 and PCIe bus 401. CPU 102 may access memory units within PP subsystem 202 via memory bridge 105 and PCIe bus 401. Likewise, PP subsystem 202 may access system memory 104 via PCIe bus 401 and memory bridge 105.

CPU 102 is the primary processor of computer system 400 and is configured to issue requests, including read requests and write requests, to system memory 104 via memory bridge 105. CPU 102 also issues requests to PP subsystem 202 across memory bridge 105 and PCIe bus 401.

PP subsystem 202 is a co-processor that is configured to perform different processing operations for CPU 102. These processing operations include data compression and decompression. PP subsystem 202 includes a PCIe interface 402 that is configured to receive requests from CPU 102 across PCIe bus 401 and route the requests to different components of PP subsystem 202 for processing. PCIe interface 402 also transmits requests to either CPU 102 or system memory 104 across PCIe bus 401. PCIe interface 402 routes data across different virtual channels (VCs) on PCIe bus 401. These virtual channels include VC0 and VC1 (not shown).

PP subsystem further includes host 404, clients 406A-406N, I/O unit 205, x-bar unit 210, L2 cache 350, and PP memory 204. I/O unit 205 allows PP subsystem to perform memory access operations and includes a memory management unit (MMU) arbiter 408, a MMU 410, a translation look-aside buffer (TLB) 412, and one or more iterators 414.

Host 404 is an engine that allows CPU 102 to access I/O unit 205. Host 404 is coupled to MMU arbiter 408 within I/O unit 205. Host 404 receives requests from CPU 102 and transmits these requests to MMU 410 via MMU arbiter 408. Clients 406A-406N are also coupled to MMU arbiter 408. Clients 406A-406N are engines that perform different functions, including memory management, graphics display, instruction fetching, encryption, texture processing and video decoding. Clients 406A-406N are configured to issue requests to I/O unit 205.

MMU arbiter 408 arbitrates between host 404 and each of clients 406A-406N and allows these engines to access MMU 410. MMU arbiter 408 examines an engine ID associated with requests received from host 404 and clients 406A-406N that indicates whether the requests originated from CPU 102. When the engine ID indicates that the request originated from CPU 102, the request is marked as "special" by causing a "special" bit within the request to equal 1. The request is then routed to MMU 410.

MMU 410 provides virtual to physical address translation to host 404 and clients 406A-406N. When host 404 and/or clients 406A-406N transmit a request to MMU 410 via MMU arbiter 408, MMU 410 translates a virtual address specified in the request into a physical address. The virtual to physical address translation may be accelerated using TLB 412. TLB 412 stores recently accessed virtual to physical address mappings. If the received virtual address is included within TLB 412, then the physical address associated with that virtual address may be quickly retrieved from TLB 412. If TLB 412 does not store the required virtual to physical mapping, then MMU 410 issues a read request to retrieve a page table that includes the required virtual to physical address mapping.

Such a read request that is issued as a direct result of another request is referred to hereinafter as a "derivative read request." If the initial request that causes the derivative read request is marked as special, then MMU 410 marks the derivative read request as special. MMU 410 transmits the derivative read request to PCIe interface 402. PCIe interface 402 routes the derivative read request on VC0 when the derivative request is not marked as special, and routes the derivative read request on VC1 when the derivative read request is marked as special. A read completion returned from a request that is not marked as special is returned on VC0, while a read completion returned from a request that is marked as special is returned on VC1. When system memory 104 receives a read completion associated with the requested data, processing of the initial request continues.

MMU 410 transmits the request and the physical address to one of the iterators 414. Iterator 414 translates the physical address into a x-bar raw address and transmits the request and the x-bar raw address to x-bar unit 210. X-bar unit 210 then routes the request to L2 cache 350.

L2 cache 350 is a low-latency memory unit that stores data that may be required by I/O unit 205. L2 cache 350 includes compression and decompression units (not shown) that allow PP subsystem 202 to compress and to decompress data received from system memory 104 or data stored in L2 cache 350. L2 cache 350 includes a tag store (not shown) that includes tags indicating a compression status of recently accessed cache lines of L2 cache 350.

When L2 cache 350 receives a write request that targets a particular cache line in L2 cache 350, L2 cache 350 uses the tag store to determine whether the targeted cache line is compressed. When the tag store does not include the compressions status of the cache line indicated by the request, L2 cache 350 generates a derivative read request in order to access a backing store (not shown) within system memory 104. L2 cache 250 transmits the derivative read request to PCIe interface 402 via x-bar unit 210. PCIe interface 402 determines whether the derivative read request is marked special, and routes the derivative read request on PCIe bus 401 accordingly. When system memory 104 returns a read completion associated with the derivative read request, this read completion is transmitted on VC1 when the derivative read request is marked as special, thus avoiding a deadlock condition when write requests are already in PCIe bus 401.

If the backing store indicates that the targeted cache line is compressed, then L2 cache 350 decompresses the targeted cache line, merges the decompressed data with the data included in the write request, and writes the decompressed and merged data back to the cache line in L2 cache 350. L2 cache 350 may also update the tag store to include the compression status of the recently accessed cache line. In one embodiment, the merged data may be compressed again. When the data is decompressed, it is stored in a decompressed format. The tag store indicates whether a tile is compressed and thus needs to be decompressed, or may be written directly without first decompressing.

L2 cache 350 may also receive a write request that specifies a compressed region of system memory 104, or a "compression tile," to which CPU 102 needs to write data. Typically, the compression tile originates in PP subsystem 202, though in one embodiment, CPU 102 generates the compression tile. L2 cache 350 receives the write request and generates a derivative read request in order to access system memory 104 and read the compression tile from system memory 350. L2 cache 350 transmits the derivative read request to PCIe interface 402 via x-bar unit 210. PCIe interface 402 determines whether the derivative read request is marked special, and routes the derivative read request on PCIe 401 accordingly. If the derivative read request is marked special, system memory 104 returns a read completion associated with the derivative read request on VC1, thus avoiding a deadlock condition that may occur when write requests are pending on PCIe bus 401. L2 cache 350 receives the compressed data returned from the derivative request, decompresses the compressed data, merges the write data with the decompressed data, compresses the merged data, and writes the compressed, merged data back to system memory 104.

Marking requests that are issued by CPU 102 as special, and also marking derivative read requests generated in response to those requests as special thus allow deadlocks to be avoided because read completions associated with requests that are marked as special are transmitted on VC1 instead of VC0. Requests may also be marked as "relaxed ordering" or marked in other ways using a standard (non PCIe) bus protocol technique that indicates read completions may be returned without concern for ordering rules. Although this technique is described above with reference to specific circumstances that may cause deadlocks, those skilled in the art will understand that marking requests issued by CPU 102 as special and also marking derivative read requests generated in response to those requests as special allows deadlocks to be avoided when PCIe bus 401 has pending write requests.

Figure 5:
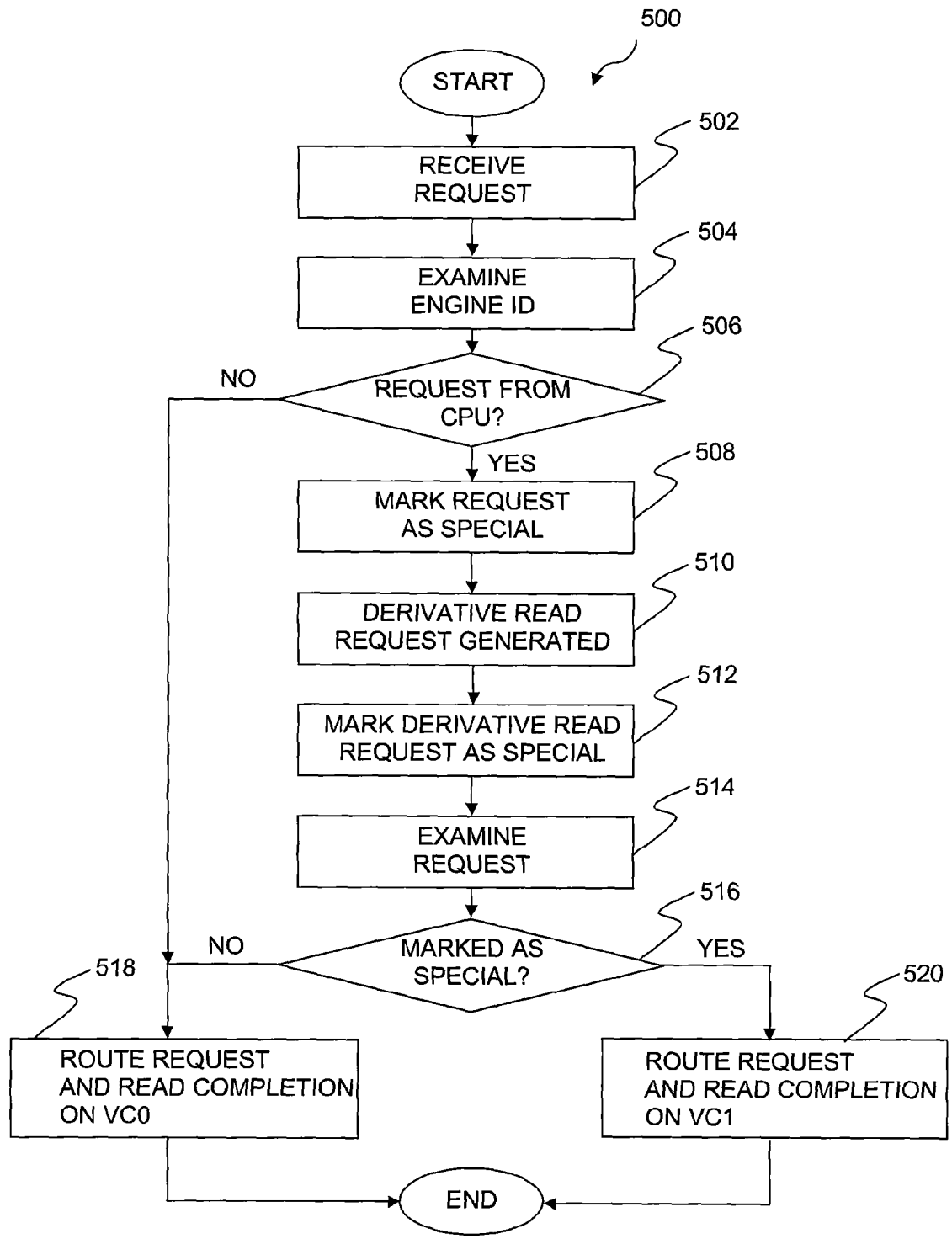
FIG. 5 if a flowchart of method steps for avoiding deadlocks, according to one embodiment of the present invention.

FIG. 5 if a flowchart of method steps for avoiding deadlocks, according to one embodiment of the present invention. Persons skilled in the art will understand that, even though the method 500 is described in conjunction with the systems of FIG. 1-4, any system configured to perform the method steps, in any order, is within the scope of the present invention.

As shown, the method 500 begins at step 502, where MMU arbiter 408 receives a request from either host 404 or one of clients 406A-406N. The request may be a read request or a write request. Additionally, the request may target L2 cache 350, PP memory 204, or system memory 104. At step 504, MMU arbiter 408 examines the engine ID associated with the request. The engine ID indicates the origin of the request. For example, the request may have been transmitted from one of clients 406A-406N or, alternatively, may have been transmitted from CPU 102 via host 404. At step 506, MMU arbiter 410 determines whether CPU 102 transmitted the request. If the engine ID indicates that CPU 102 transmitted the request, then the method 500 proceeds to step 508. If, at step 506, the MMU arbiter 410 determines that CPU 102 did not transmit the request, then the method 500 proceeds to step 518.

At step 508, MMU arbiter 408 marks the request as special. MMU arbiter 408 is configured to set a bit in the request to "1" to indicate that the request was transmitted from CPU 102. At step 510, the request causes a derivative read request to be generated. The request causes a derivative read request to be generated under different circumstances. For example, when a read of system memory 104 is required so that MMU 410 may perform a virtual-to-physical address translation, MMU 410 generates a derivative read request that targets system memory 104. Alternatively, when a read of system memory 104 is required so that L2 cache 350 may determine the compression status of a cache line, L2 cache 350 generates a derivative read request that targets system memory 104. Various other scenarios are possible where an initial request causes a derivative read request to be generated.

At step 512, the derivative read request is marked as special. When MMU 410 generates the derivative read request, MMU 410 marks the derivative read request as special. When L2 cache 250 generates the derivative read request, L2 cache 350 marks the derivative read request as special. If another component of PP subsystem 202 generates the derivative read request, that component marks the derivative read request as special. At step 514, the PCIe interface 402 receives and examines a request. The request may be the derivative read request or, alternatively, a different request.

At step 516, PCIe interface 402 determines whether the request is marked as special. If the request is not marked as special, then the method 500 advances to step 518, where PCIe interface 402 routes the request and read completions associated with the request across VC0 of the PCIe bus 401. If the request is marked as special, then the method 500 advances to step 520, and PCIe interface 402 routes the request and read completions associated with the request across VC1 of the PCIe bus 401. The method then terminates.

In sum, a parallel processing unit (PPU) marks a request received from a central processing unit (CPU) as "special" so that derivative read requests generated in response to the request are also marked as special and thus routed on a secondary virtual channel of the peripheral component interface express (PCIe) bus. The PPU transmits requests marked as special across virtual channel (VC) 1 of the peripheral component interface express (PCIe) bus. If a request marked as special generates a read completion, the read completion is returned across VC1 of the PCIe bus.

Advantageously, read completions that are returned from requests marked as special cannot cause a deadlock when write requests are already in VC0 because the read completions associated with the requests marked as special are transmitted on a different virtual channel.

Accordingly, embodiments of the invention provide a technique for identifying and marking certain requests issued by the CPU 102 to the PP subsystem 202 that would cause deadlock (e.g., read and write requests) using a state bit that propagates through the fabric and any derivative transactions caused by the request are also marked with the state bit. In other embodiments, a standard bus interface defined mechanism (e.g. "relaxed ordering") may be used for deadlock avoidance.

It is noted that certain transactions transmitted by PP subsystem 202 to system memory 104 do not cause deadlock and thus may not be transported on the second virtual channel. For example, transactions that are used as synchronization primitives or that otherwise depend on the ordering rule that read completions not pass write requests, are transmitted on the first virtual channel. For example, when a semaphore acquire is issued by the PP subsystem 202 to detect when a CPU 102 write to PP memory 204 is complete, the read completion guarantees that all earlier CPU-initiated write transactions have reached the point of coherency.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. In a computer system having a first processing unit, a second processing unit, a memory bridge, a system memory, and a bus that connects the second processing unit to the first processing unit, the memory bridge, and the system memory, a method for processing a read or write request at a second processing unit, comprising the steps of:
   receiving a read or write request at the second processing unit via the bus, wherein the read or write request is received via a first virtual channel implemented by a bus interface unit within the second processing unit;
   determining whether the read or write request includes a client identifier that indicates that the read or write request originated at the first processing unit;
   if the client identifier indicates that the read or write request originated at the first processing unit, then marking the read or write request as special, or
   if the client identifier indicates that the read or write request did not originate at the first processing unit, then marking the read or write request as not special;
   generating one or more derivative read requests at the second processing unit, wherein the one or more derivative read requests are associated with the read or write request;
   if the read or write request is marked as special, then marking the one or more derivative read requests as special, or
   if the read or write request is marked as not special, then marking the one or more derivative read requests as not special;
   transmitting the one or more derivative read requests to the system memory via the bus, wherein the one or more derivative read requests are associated with a second virtual channel implemented by the bus interface unit;
   receiving a completion of the one or more derivative read requests via the bus, wherein the completion is associated with the second virtual channel; and
   completing the original received read or write request.

2. The method according to claim 1, wherein the read or write request is marked as special by setting a special bit equal to 1.

3. The method according to claim 1, further comprising the step of accessing a cache memory unit associated with the second processing unit, wherein the one or more derivative read requests are generated in response to a miss occurring within the cache memory unit.

4. The method according to claim 3, wherein the cache memory unit is a translation lookaside buffer that is accessed to obtain memory addresses associated with the read or write request.

5. The method according to claim 3, wherein the cache memory unit is a Level-2 cache that is accessed to obtain compression status of data associated with the read or write request.

6. The method according to claim 1, wherein the one or more derivative read requests are generated when a compressed region of the system memory is accessed while processing the read or write request.

7. A computer system comprising:
a first processing unit, a second processing unit, a memory bridge, a system memory, and a bus that connects the second processing unit to the first processing unit, the memory bridge, and the system memory;
wherein the second processing unit includes a bus interface unit that implements a first virtual channel and a second virtual channel and is configured to:
(i) receive a read or write request over the first virtual channel;
(ii) determine whether the read or write request includes a client identifier that indicates that the read or write request originated at the first processing unit;
(iii) if the client identifier indicates that the read or write request originated at the first processing unit, then mark the read or write request as special, or if the client identifier indicates that the read or write request did not originate at the first processing unit, then mark the read or write request as not special;
(iv) if the read or write request is marked as special, then mark a derivative read request as special, or if the read or write request is marked as not special, then mark the derivative read request as not special; and
(v) transmit the derivative read request that is generated while processing the read or write request over the second virtual channel.

8. The computer system according to claim 7, wherein the second processing unit further includes a memory management unit having a translation lookaside buffer, and the memory management unit generates the derivative read request when a miss occurs in the translation lookaside buffer.

9. The computer system according to claim 7, further comprising a local memory for the second processing unit, wherein the second processing unit is connected to the local memory through a cache memory unit and the cache memory unit generates the derivative read request.

10. The computer system according to claim 9, wherein the cache memory unit generates the derivative read request when the read or write request accesses compression status information that is not stored in the cache memory unit.

11. The computer system according to claim 9, wherein the cache memory unit generates the derivative read request when the read or write request accesses data from a compressed region of the system memory.

12. The computer system according to claim 7, wherein the second processing unit further includes a memory management unit arbiter that is configured to receive read or write requests from a plurality of clients, and wherein marking the read or write request as special is performed by the memory management unit arbiter before forwarding the read or write request to a memory management unit.

13. The computer system according to claim 12, wherein each of the clients has a client identifier and the memory management unit arbiter is configured to examine the client identifier associated with each read or write request.

14. The computer system according to claim 7, wherein the first processing unit is a central processing unit, the second processing unit a parallel processing unit, and the bus a PCIe bus.

15. A non-transitory computer readable storage medium comprising instructions for a parallel processing unit that, when executing the instructions, carries out the steps of:
determining whether a read or a write request associated with a first virtual bus channel includes a client identifier that indicates that the read or write request originated from a central processing unit;
if the client identifier indicates that the read or write request originated from the central processing unit, then marking the read or write request as special, or
if the client identifier indicates that the read or write request did not originate from the central processing unit, then marking the read or write request as not special;
generating one or more derivative read requests associated with the read or write request; and
if the read or write request is marked as special, then marking a derivative read request as special, or if the read or write request is marked as not special, then marking the derivative read request as not special.

16. The non-transitory computer readable storage medium according to claim 15, further comprising instructions that, when executed by the parallel processing unit, cause the parallel processing unit to carry out the step of:
transmitting a derivative read request that is generated as the read or write request is being processed over a bus channel that is different from a bus channel over which the read or write request was received.

17. The non-transitory computer readable storage medium according to claim 15, wherein the parallel processing unit marks the read or write request as special by setting a special bit equal to 1.

* * * * *